United States Patent Office 3,442,729
Patented May 6, 1969

3,442,729
AQUEOUS INORGANIC OXIDIZER SALT EXPLOSIVES AND ACRYLAMIDE POLYMERS AS THICKENER THEREFOR
Herbert G. Knight, Jr., Flanders, N.J., assignor to Hercules Incorporated, Wilmington, Del., a corporation of Delaware
No Drawing. Filed Dec. 28, 1967, Ser. No. 694,097
Int. Cl. C06b 1/04
U.S. Cl. 149—60                                12 Claims

ABSTRACT OF THE DISCLOSURE

Pourable inorganic oxidizer salt explosives of the aqueous slurry type containing a novel thickener component which imparts improved stability and high water resistance to the slurry suspension while retaining pourability over prolonged periods.

---

The novel thickener is a combination of polymers I and II:

Polymer I.—A partially hydrolyzed acrylamide polymer having a degree of hydrolysis such that 15 to 40 percent of the monomeric units therein have been converted to the hydrolyzed form and the polymer having a molecular weight such that a 1 percent solution of the polymer in distilled water will have a viscosity in the range of 1500 to 7000 centipoises at 25° C.

Polymer II.—Formed by copolymerizing acrylamide with at least one acrylate of the group consisting of ammonium and alkali metal acrylates, in an acrylamide to total acrylate weight ratio within the range of 40:1 to 2:1, in an aqueous solvent medium containing from 30 to 65 weight percent water and selected from the group consisting of water-tertiary butanol, water-acetone, and water-tertiary butanol-acetone, at a temperature of 0–60° C., and cross-linking the resulting polymer as an ingredient of said thickener component during the formation of said explosive by action of from 0.001 to 0.1 percent of a polyvalent metal salt cross-linking agent therefor, based on the weight of said explosive.

This invention relates to inorganic oxidizer salt explosive compositions of the aqueous slurry type containing a novel thickener component providing for a stable, highly water-resistant, suspension of slurry ingredients that remains readily flowable for all handling up to and including emplacement for shooting. Other aspects of this invention will be apparent to one skilled in the art in light of the accompanying disclosure and the appended claims.

Inorganic oxidizer salt explosive compositions of the aqueous slurry type have had wide use in the explosives industry in recent years. These compositions comprise an inorganic oxidizer salt, water, a sensitizer, and a thickening agent in at least an amount to impart sufficient consistency to the slurry to prevent settling of ingredients. Exemplary of these compositions are those disclosed and claimed in U.S. Patents 3,235,425 and 2,930,685.

Exemplary of the various thickener components of the above slurry type composition that have been utilized are sodium carboxymethylcellulose, Karaya gum, water-soluble starches, manno-galactans, locust bean gum, cereal products, and the like. Of these, perhaps guar gum has been the most widely used, particularly because it is easily hydrated and cross-linked to impart to the composition a suitable degree of consistency over a broad range.

However, cross-linking of guar gum is generally rapid and in those instances in which guar gum is to be utilized as a thickener in cross-linked form, and the slurry ingredients are to be pumped into the emplacement zone, the cross-linking agent is necessarily added just prior to emplacement in order to sufficiently limit the thickening action and retain the pumpability of the slurry during the entire emplacement period. This type operation, which has been practiced in the industry for some time requires equipment for moving separate streams of slurry ingredients into final admixture just prior to the emplacement so that final cross-linking action can not take place prematurely to impair flowability. In the loading of boreholes this of course requires not only extensive loading equipment, including various pumps and auxiliary lines, hoppers and the like, but also special transport facilities for moving the equipment to the borehole site.

Slurry type explosives are sometimes packaged in bags and in those instances the thickening action has generally proceeded to a degree that the composition is of rather firm consistency, so that upon being loaded in a borehole the packaged unit cannot conform to the shape of the borehole to fill the entire cross-section of the hole, and hence the loading efficiency is impaired. On the other hand if the individual package is cut so as to free its contents to fill the entire cross-section of a water-containing borehole, the slurry must still be sufficiently thickened to withstand leaching action of the water, and again such degree of thickening impairs maximum loading efficiency of the composition. Still further, if a slurry of minimum thickness is packaged so that the package can be efficiently loaded in a borehole and the container is broken during loading, the slurry content released from the container is lost upon contact with water in the borehole, due to its thin consistency and low resistance to leaching action of the water.

This invention is concerned with pourable inorganic oxidizer salt explosives of the aqueous slurry type containing a thickener component which imparts the necessary cosistency to the slurry for holding all ingredients thereof, in suspension, and which also imparts high water resistance to the resulting slurry over prolonged periods without impairing its pourability. The invention eliminates the need for operation of transport and pumping equipment often necessary for handling separate streams of slurry explosive ingredients for regulation of rate of thickening action. The invention further provides for merely pouring or directly pumping the finished slurry into emplacement without substantial loss of ingredients to leaching action of water or, alternatively, for loading it in packaged form without sacrifice in loading density or loss of any ingredients to leaching action of water when released from the package as result of failure of the container.

In accordance with the invention, pourable inorganic oxidizer salt explosives of the aqueous slurry type, containing a thickener component therefor are provided, wherein the thickener component is a combination of polymers I and II in a polymer I to polymer II weight ratio within the range of from 10:1 to 1:1; said polymer I being a partially hydrolyzed acrylamide polymer having a degree of hydrolysis such that 15 to 40 percent of the monomeric units therein have been converted to the hydrolyzed form, and the polymer having a molecular weight such that a 1 percent solution of the polymer in distilled water will have a viscosity in the range of 1500 to 7000 centipoises at 25° C., and said polymer II being formed by copolymerizing acrylamide with at least one acrylate of the group consisting of ammonium and alkali metal acrylates, in an acrylamide to total acrylate weight ratio within the range of 40:1 to 2:1, in an aqueous solvent medium containing from 30 to 65 weight percent water and selected from the group consisting of water-tertiary butanol, water-acetone, and water-tertiary butanol-acetone, at a temperature of 0–60° C., and cross-linking the resulting polymer as an ingredient of said thickener component during the formation of said explosive by action of from 0.001 to 0.1 percent of a polyvalent metal salt cross-linking agent therefor, based on the weight of said explosive.

I have found that the polymer I ingredient, as a sole thickener in pourable inorganic oxidizer salt slurry type explosives, imparts a thickening action thereto to maintain pourability, but that the resulting suspension is not stable, i.e. there is a marked separation of ingredients; and that the difficulty cannot be remedied by cross-linking the polymer I. I have also found that the polymer II ingredient, as a sole thickener, in such slurry explosives also imparts a thickening action, but again, the stability of the resulting suspension is limited, even though the polymer II is readily cross-linkable and is present in cross-linked form. I have found, however, that the above defined combination of polymers I and II, i.e. as the thickener component, imparts unique thickening action to such pourable slurry explosives not possible when either ingredient is sole thickener. The pourability of a pourable slurry explosive, in accordance with the invention, is not only retained over extended periods and hence the suspension is of marked stability, but the resulting stable pourable suspension is highly water resistant; and it can be pumped or easily poured into emplacement at any time over a prolonged period, including emplacement in water-containing boreholes without separation of ingredients and without substantial leaching action of the water.

My invention is based on my discovery of a specific range of conditions of cross-linking agent concentration within which there exists a unique relationship between cross-linkability of polymer I and cross-linkability of polymer II to provide unexpected thickening action of the combination of polymers I and II, in accordance with the invention. I have found that under these conditions of cross-linking agent concentration, the polymer I is not cross-linked to any appreciable degree but that the polymer II is readily cross-linked to a limited degree, and that when the polymer II is cross-linked in the presence of polymer I during formation of the explosive, the unexpected thickening action is accomplished; and, further, that the degree of thickening action can be regulated, and controlled, by so cross-linking the polymer II under varied conditions of cross-linking agent concentration within the defined range thereof.

Generally, the slurry type compositions of the invention contain on a weight percent basis, from 0.4 to 1.5 percent of the above described thickener component, from 8 to 25 percent water, from 20 to 75 percent inorganic oxidizer salt from 3 to 50 percent sensitizer.

Now preferred compositions of the invention contain (weight basis) from 12 to 20 percent water, from 20 to 60 percent ammonium nitrate together with 5 to 20 percent sodium nitrate as the inorganic oxidizer salt, from 8 to 45 percent sensitizer and from about 0.8 to 1.2 percent of the above described thickener component.

By the term "inorganic oxidizer salt" as is well known in the explosives art, is meant one which, under the conditions of the detonation supplies oxygen for the oxygen balance required. Ammonium nitrate is in many instances the only oxygen-supplying salt component. However, other inorganic oxygen-supplying salts can be used alone or with ammonium nitrate as a supplementary oxidizer salt. Of these, the alkali metal nitrates are now preferred. Exemplary oxygen supplying salts that can be used alone or together with ammonium nitrate as supplementary oxidizer salts are alkali metal and alkali earth metal nitrates and perchlorates (including ammonium) as for example, sodium nitrate, magnesium nitrate, calcium nitrate, potassium nitrate, barium nitrate, sodium perchlorate, ammonium perchlorate, calcium perchlorate and magnesium perchlorate.

Often when ammonium nitrate is utilized with a supplementary salt, it comprises at least a major proportion, i.e., at least 50 percent of the total oxidizer salt component, however, weight ratios of ammonium nitrate to supplementary oxidizer salt, sodium nitrate now preferred, are generally in the range of from about 4:1 to 0.3:1.

Particle size of the oxidizer salt ingredients is not critical. For example, ammonium nitrate can consist of prills, such as used in the fertilizer industry, or it can be granular and in that form vary from coarse to fine. Other oxidizer salt ingredients are generally of comparable particle size.

The compositions of the invention are in most instances insensitive to detonating action of a commercial No. 8 blasting cap but detonatable by convention "booster" charges of PETN (pentaerythritol tetranitrate), RDX (cyclotrimethylenetrinitramine), Pentolite (PETN-TNT), tetryl, Composition B (RDX-TNT), and the like. One booster advantageously employed is a dispersion of a crystalline high explosive, e.g., PETN or RDX, in a plastic carrier such as described in U.S. Patent 2,965,466 and which is detonated by either a commercial blasting cap or detonating fuse.

Any of the various known sensitizer materials for inorganic oxidizer salt blasting compositions of the aqueous slurry type, above described, can be utilized as such, in the compositions of the invention. Exemplary of now preferred sensitizer components are smokeless powder as disclosed and claimed in the above said U.S. 3,235,425 and TNT and/or particulate aluminum as disclosed and claimed in the above said U.S. 2,930,685. Other suitable sensitizers include particulate aluminum, particulate magnesium-aluminum alloys, and high explosives such as PETN, tetryl, and the like.

Ethylene glycol, formamide, urea and other water soluble organic compounds are often added as supplementary fuel component to the formulation, generally in an amount of less than 15 weight percent of these materials. The total energy of the slurry explosive composition is often increased by the addition of various solid energizers such as aluminum, ferrosilicon, ferrophosphrous, silicon, and the like, generally in a total amount less than about 20 weight percent. In all events, dependent on the particular solid energizer material, the total amount is not in excess of that which would adversely affect flow properties of the final slurry composition, i.e., to impair pourability.

The polymeric I ingredient, above described, is that described in U.S. Patent 3,341,383, granted Sept. 12, 1967, and in preferred practice contains from about 20 to 35 percent of the monomeric units therein converted to the hydrolyzed form, often in the order of about 22 percent together with a polymer viscosity of about 4000 centipoises.

The polymeric II copolymer ingredient, above described, is disclosed in most of the monomeric unit proportions contemplated in practice of this invention in the copending application of Harrison et al., Ser. No. 594,400, filed Nov. 15, 1966; and, in preferred practice has an acrylamide to total acrylate weight ratio not exceeding 20:1 and often within the range of about 6:1 to 12:1, a weight ratio of about 9:1 being advantageously employed in many instances.

The polymeric II ingredient is a copolymer and is prepared by only one known process, i.e. which will produce the polymeric II ingredient having the properties applicable in the present invention. This process is referred to as a precipitation polymerization and comprises polymerizing a solution of acrylamide and acrylate monomers in aqueous tertiary butanol, aqueous acetone or aqueous tertiary butanol-acetone in the substantial absence of air while agitating the solution to give a copolymer product that can be isolated by filtration, the aqueous tertiary butanol and aqueous acetone being solvents for the monomers but nonsolvents for the copolymer product.

Solvent and temperature conditions of this precipitation polymerization process are critical. Thus, the solvent for the monomers must be aqueous tertiary butanol, aqueous acetone, or aqueous tertiary butanol-acetone (i.e. mixtures of water with tertiary butanol or acetone alone or with both). The concentrations of water in said mixtures must be 30 to 65 percent, preferably 45 to 60 percent, by weight of said mixtures. The polymerization reaction temperature must be 0° C. to 60° C., preferably 0° C. to 40° C.

The polymerization may be carried out either in the presence or absence of a polymerization catalyst (initiator), but preferably a polymerization initiator will be used. Both the types and amounts of free radical initiator applicable are well known in this art. Peroxygen compounds are quite suitable, including e.g. ammonium persulfate, potassium persulfate and hydrogen peroxide. Other free radical initiators include e.g. $\alpha,\alpha'$-azo-bis-isobutyronitrile. The peroxygen initiators may be used alone or in combination with activators (also well known in this art) including e.g., sodium bisulfite, sodium thiosulfate, tetramethylethylenediamine, thiourea and ferrous chloride, said combination forming a redox system. The amount of initiator usually will not exceed 0.5 percent, preferably is 0.05 to 0.2 percent, 0.05 percent being specifically preferred, by weight of the combined weight of monomers.

Although not necessary, preferably the precipitation polymerization is carried out in the presence of a salt dissolved in the polymerization reaction mixture. By polymerizing in the presence of a salt, or a buffer system comprising one or more salts in combination with another material to complete the buffer system, recovery of the copolymer product is substantially facilitated. These salts and buffer systems include, e.g., (1) alkali metal and ammonium acetates, carbonates, bicarbonates, chlorides, phosphates, sulfates, bisulfates, borates; (2) buffer systems comprising (a) mixtures of weak acid or weak base and their salts including (b) phthalates, citrates, borates, phosphates, acetates, ammonium hydroxide, ammonium acetate, ammonium chloride, (c) specific combinations including mixtures of boric acid-borax, critric acid-sodium acid phosphate, sodium carbonate-sodium bicarbonate, ammonium-ammonium hydroxide, ammonium acetate-ammonium hydroxide; or (3) any combination of (1) and (2).

The amount of salt which may be used is about 0.1 to 2.0 percent, preferably about 0.2 to 0.7 percent, by weight of the reaction mixture. If the amount of salt exceeds about 2.0 percent, usually there is a tendency for the granules of the polymeric product to agglomerate in the polymerization reaction mixture. The manner of adding the salt and the point at which it is added are not critical.

Any suitable procedure can be utilized in the manufacture of the slurry type compositions of the invention. In accordance with one such procedure, the required mixture of polymeric I and II ingredients is dispersed in a nonaqueous liquid, generally ethylene glycol and then added to a hot aqueous solution of the inorganic oxidizer salt in an amount to permit sufficient thickening to retain subsequently added ingredients in suspension. After the addition of all ingredients, during which time the mixture is under constant agitation, a suitable cross-linking agent is added such as a polyvalent metal salt. Although the cross-linking agent is preferably the last added ingredient, it can be added at any time during formation of explosive slurry after a portion of each of polymer I and polymer II ingredients is added, preferably after the polymer I and polymer II ingredients are added in their entirety.

Further exemplary of well-known polyvalent metal salt cross-linking agents for the formation of the polymer II ingredient are alum, chromium acetate and ferric citrate. Trivalent metal salt cross-linking agents are generally preferred.

Often a paraffin oil is added to the final slurry product to serve as a release agent when the product is packaged, i.e. to facilitate removal of the slurry from its package during field use. The above described use of a paraffin oil or other suitable release agents, per se, is not a part of this invention.

It is a feature of the invention that the combination of the polymer I and II ingredients provides for a broad range of viscosities permitting pourability of the slurry composition at all times. Pourability can be varied by regulation of the concentration of cross-linking agent for the polymer II and/or by the relative proportions of polymers I and II, the polymer being substantially noncross-linkable under the mixing, storing and handling conditions applicable to the slurry compositions of the invention. Thus, if a relatively low degree of pourability is desired as is often the case when the slurry explosive product is packaged, the ratio of polymer II to polymer I, and/or the concentration of cross-linking agent, is increased to a higher level than would be the case in the event that higher degree of fluidity were required. In all events, by regulating the ratio of the polymer I to II ingredients and the amount of cross-linking agent to be utilized, the pourability is regulated over a broad range. However, in all instances the compositions of the invention, as disclosed and claimed herein, are pourable over prolonged periods and obviously the entire system during the entire mixing step is at all times of sufficiently low viscosity so as to afford complete, and uniform, mixing in a relatively short period of time.

It is a further feature of the invention that although fluid, i.e. pourable at all times, the slurry compositions as disclosed and claimed herein are highly water resistant, even when gravitated through long columns of water, under which conditions substantially no leaching of salts or dilution of the slurry takes place. Obviously, the highly fluid state of the compositions of this invention provides for borehole loading efficiency without obstruction by materials along the borehole wall.

When for any reason it is desired that the slurry explosive product of the invention be packaged for utilization, the fluidity of the packaged composition permits it to take the shape of the borehole cross-section and therefore load at substantially maximum density; and in the event of failure of the container, the slurry that is lost therefrom is substantially completely resistant to water leaching, which, of course, is of significance in water-containing boreholes.

The invention is illustrated with reference to the slurry type explosive compositions set forth in the following table:

TABLE

| Example Number | 1 | 2 | 3 | 4 | 5 | 6 | 7 | 8 | 9 |
|---|---|---|---|---|---|---|---|---|---|
| Water | 17.9 | 18.0 | 18.0 | 18.0 | 18.0 | 18.0 | 21.0 | 17.0 | 17.9 |
| Smokeless Powder [1] | 34.8 | 35.0 | 17.5 | 40.0 | 40.0 | 40.0 | 35.0 | 35.0 | 34.8 |
| TNT [2] | | | 17.5 | | | | | | |
| Ammonium Nitrate | 21.9 | 22.0 | 22.0 | 20.0 | 20.0 | 17.0 | | | 21.9 |
| Sodium Nitrate | 12.9 | 13.0 | 13.0 | 12.0 | 12.0 | 10.9 | | 10.0 | 12.9 |
| Sodium Perchlorate | | | | | | | 31.4 | 25.4 | |
| Aluminum [3] | | | | | | | | | 5.0 |
| Urea | | | | | 8.4 | 10.0 | | | |
| Formamide | | | | 8.4 | | | | | |
| Ethylene Glycol | 10.9 | 10.4 | 10.4 | | | 2.5 | 11.0 | 11.0 | 5.9 |
| Pine Oil | 0.1 | 0.1 | 0.1 | 0.1 | 0.1 | 0.1 | 0.1 | 0.1 | 0.1 |
| Thickener: | | | | | | | | | |
| Polymer I | 0.7 | 0.7 | 0.7 | 0.7 | 0.7 | 0.7 | 0.7 | 0.7 | 0.7 |
| Polymer II [4] | 0.3 | 0.3 | 0.3 | 0.3 | 0.3 | 0.3 | 0.3 | 0.3 | 0.3 |
| Basic Aluminum Acetate [5] | 0.003 | 0.003 | 0.003 | 0.003 | 0.003 | 0.003 | 0.003 | 0.003 | 0.003 |
| Ferrous Ammonium Acetate [5] | | | | | | | | | |
| Paraffin Oil | 0.5 | 0.5 | 0.5 | 0.5 | 0.5 | 0.5 | 0.5 | 0.5 | 0.5 |
| Specific Gravity—60/60° F | 1.30 | 1.38 | 1.39 | 1.41 | 1.35 | 1.37 | 1.49 | 1.51 | 1.35 |
| Funnel Test, Seconds [6] | 26 | 18 | 11 | 18 | 36 | 32 | 40 | 58 | 28 |
| Ingredient Separation After 2 Days | None | None | None | None | None | None | None | None | None |
| Detonation Rate, m./sec.: [7] | | | | | | | | | |
| Unconfined (minimum diam., inches) | 4,650 (5) | 4,900 (3) | 5,250 (3) | 5,400 (2½) | 4,750 (3) | 5,000 (3) | 5,550 (3) | 5,150 (3) | |
| Confined (minimum diam., inches) | | | | | | | | | 5,000 (2½) |
| After slurry poured from container into, and gravitated through, 20 foot column of water. Column diam., inches: | | | | | | | | | |
| 4 | 4,650 | | | | | | | | |
| 3 | 5,150 | | | | | | | | |
| 2½ | 4,750 | | | | | | | | |
| 3″ Borehole Tests (3 ft. of water) [8] | | | | | | | | | |

| Example Number | 10 | 11 | 12 | 13 | 14 | 15 | 16 | 17 |
|---|---|---|---|---|---|---|---|---|
| Water | 17.9 | 17.9 | 18.0 | 17.9 | 18.0 | 18.0 | 18.0 | 18.0 |
| Smokeless Powder [1] | 30.0 | 34.8 | 35.0 | 34.8 | | 30.0 | 30.0 | 30.0 |
| TNT [2] | | | | | 33.0 | | | |
| Ammonium Nitrate | 21.9 | 22.4 | 22.0 | 25.6 | 27.0 | 30.0 | 30.0 | 30.0 |
| Sodium Nitrate | 12.9 | 12.9 | 13.0 | 15.1 | 17.7 | 18.4 | 18.4 | 18.4 |
| Sodium Perchlorate | | | | | | | | |
| Aluminum [3] | 10.0 | | | | | | | |
| Urea | | | | | 3.0 | | | |
| Formamide | 5.7 | 10.9 | 10.9 | 5.0 | | 2.9 | 2.5 | 2.5 |
| Ethylene Glycol | 0.1 | 0.1 | 0.1 | 0.1 | 0.1 | 0.1 | 0.1 | 0.1 |
| Pine Oil | | | | | | | | |
| Thickener: | | | | | | | | |
| Polymer I | 0.7 | 0.7 | 0.8 | 0.7 | 0.8 | 0.6 | 1.0 | None |
| Polymer II [4] | 0.3 | 0.3 | 0.2 | 0.3 | 0.4 | None | None | 1.0 |
| Basic Aluminum Acetate [5] | 0.003 | | 0.004 | 0.003 | 0.004 | 0.0045 | 0.008 | 0.008 |
| Ferrous Ammonium Acetate [5] | | 0.006 | | | | | | |
| Paraffin Oil | 0.5 | | | 0.5 | | | | |
| Specific Gravity—60/60° F | 1.32 | | | | | | | |
| Funnel Test, Seconds [6] | No flow | 33 | 16 | 26 | 33 | 7 | 16½ | 72 |
| Ingredient Separation After 2 Days | None | None | None | None | None | Severe | Severe | None |
| Detonation Rate, m./sec.: [7] | | | | | | | | |
| Unconfined (minimum diam., inches) | | | | | | | | |
| Confined (minimum diam., inches) | 4,750 (2½) | | | | | | | |
| After slurry poured from container into, and gravitated through, 20 foot column of water. Column diam., inches: | | | | | | | | |
| 4 | | | | | | | | |
| 3 | | | | | | | | |
| 2½ | | | | | | | | |
| 3″ Borehole Tests (3 ft. of water) [8] | | | | | | [9] | | [10] |

[1] Examples 1, 3-13, and 15-17, ground 40 mm. Example 2, 30.0 percent ground 40 mm. of Example 1, and 5.0 percent double base sporting powder.
[2] Pellets (Pelletol).
[3] Particulate aluminum.
[4] Copolymer of acrylamide and sodium acrylate having an acrylamide:sodium acrylate weight ratio of 9:1.
[5] Cross-linking agent for polymeric material II.
[6] Funnel Test—Approximately 2 liters of slurry is poured into an aluminum funnel having an orifice of varied diameter. When the orifice is opened to permit flow, the timing is started. When light is visible through the orifice (looking down into the funnel), timing is stopped. The time difference is designated as the flow time. 2 inch orifice—Examples 1-8 and 11-17 incl.; 3 inch orifice—Examples 9 and 10. All tests made at least 1 day after preparation of the formulation.
[7] Measured as average detonation velocity over a 20 cm. length, at the end of a 28″ long column of explosive. The time for detonation to proceed across the 20 cm. length of explosive was measured electronically with a counter-chronograph. m./s.=meters per second. All shots initiated by action of a Pentolite booster charge in an amount within the limits of 160 to 485 grams.
[8] Borehole loaded, and viscosity observed.
[9] Slurry broke up.
[10] Slurry plugged borehole and broke up.

Examples 1-18 illustrate the slurry compositions of the invention and the criticality of the combination of thickener component ingredients I and II. Thus, in Examples 1, 2 and 3, pourable slurry compositions of the invention are shown utilizing smokeless powder and TNT as sensitizers; Examples 4, 5 and 6 illustrate the utilization of various water-soluble fuels; Examples 7 and 8 illustrate the use of perchlorates alone or with other inorganic oxidizer salts as the inorganic oxidizer salt component. As shown in Examples 9 and 10, pourability is influenced by the presence of unduly large proportions of solid fuel ingredient. In Example 10 no flow was observed while carrying out the 3-inch funnel test when 10 percent particulate aluminum was present, and, as shown in Example 9, the pourability was significantly lowered by the presence of 5 percent aluminum. These examples are not intended to indicate a maximum content of solid fuel that can be utilized inasmuch as the actual maximum quantity of solid energizer that can be used in any specific instance depends upon the fluidity of the remaining ingredients. As illustrated by Examples 9 and 10, it is necessary that total solids content of the composition of the invention be limited to that which does not preclude their pourability. Any composition of the invention that gravitates through a 2-inch orifice is considered pourable.

Example 11 illustrates the use of a cross-linking agent other than basic aluminum acetate and hence that any one of a large number of well known polyvalent metal salt cross-linking agents can be utilized for the polymer II ingredient. Examples 12, 13 and 14 illustrate the use of various percentages of polymeric ingredients I and II.

Examples 15, 16 and 17 illustrate the need for a blend of the two polymer ingredients I and II. Thus, Examples 15 and 16 show severe ingredient separation after two days when Polymeric Material I was the only thickener component ingredient even though present at a content up to 1.0 percent. Example 17 similarly demonstrates break up of slurry and plugged borehole (as also shown in Example 15) in accordance with the 3" borehole test. These examples demonstrate that operability is not a matter of a total proportion of one or the other of the polymeric ingredient I or II but that it is the defined blend of thickener ingredients I and II that is required in order to maintain the necessary stable and water-resistant but readily pourable suspension of slurry ingredients.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. An inorganic oxidizer salt explosive composition of the aqueous slurry type, containing a combination of polymers I and II in a polymer I to polymer II weight ratio within the range of from 10:1 to 1:1, as a thickener component imparting thickening action to said slurry while maintaining same pourable; said polymer I being a partially hydrolyzed acrylamide polymer having a degree of hydrolysis such that 15 to 40 percent of the monomeric units therein have been converted to the hydrolyzed form, and the polymer having a molecular weight such that a 1 percent solution of the polymer in distilled water will have a viscosity in the range of 1500 to 7000 centipoises at 25° C., and said polymer II being a cross-linked product formed by copolymerizing acrylamide with at least one acrylate selected from the group consisting of ammonium and alkali metal acrylates in an acrylamide to total acrylate weight ratio within the range of from 40:1 to 2:1 in an aqueous solvent medium containing from 30 to 65 weight percent water and selected from the group consisting of water-tertiary butanol, water-acetone, and water-tertiary butanol-acetone, at a temperature of from 0 to 60° C., and cross-linking the resulting copolymer as an ingredient of said thickener component during the formation of said explosive composition by action of from 0.001 to 0.1 percent of a polyvalent metal salt cross-linking agent therefor, based on the weight of said explosive.

2. A composition of claim 1 containing from 0.4 to 1.5 weight percent of said thickener component.

3. A composition of claim 2 containing from 0.8 to 1.2 weight percent of said thickener component.

4. A composition of claim 2 containing, on a weight basis, from 8 to 25 percent water, from 20 to 75 percent inorganic oxidizer salt, and from 3 to about 50 percent of a sensitizer.

5. A composition of claim 4 containing from 12 to 20 percent water, from 20 to 60 percent ammonium nitrate together with from 5 to 20 percent sodium nitrate as said inorganic oxidizer salt, and from 8 to 45 percent of said sensitizer.

6. A composition of claim 5 wherein said polymer I has a degree of hydrolysis such that from 20 to 35 percent of the monomeric units therein are converted to the hydrolyzed form.

7. A composition of claim 5 wherein said polymer I has a degree of hydrolysis such that about 22 percent of the monomeric units therein are converted to the hydrolyzed form, and said viscosity is about 4000 centipoises.

8. A composition of claim 1 wherein said polymer II has an acrylamide to total acrylate weight ratio not exceeding about 20:1.

9. A composition of claim 8 wherein said weight ratio is within the range of from 6:1 to 12:1.

10. A composition of claim 7 wherein said weight ratio is about 9:1.

11. A composition of claim 10 wherein said acrylate is sodium acrylate.

12. A composition of claim 10 wherein said acrylate is ammonium acrylate.

References Cited

UNITED STATES PATENTS

| | | | |
|---|---|---|---|
| 3,097,120 | 7/1963 | Hoffman et al. | 149—60 XR |
| 3,097,121 | 7/1963 | Bowkley et al. | 149—60 |
| 3,321,344 | 5/1967 | Arbie | 149—60 XR |
| 3,341,383 | 9/1967 | Bergwerk | 149—44 XR |
| 3,355,336 | 11/1967 | Lyerly | 149—60 |

BENJAMIN R. PADGETT, *Primary Examiner.*

S. J. LECHERT, *Assistant Examiner.*

U.S. Cl. X.R.

149—38, 39, 41, 44, 60, 61